United States Patent [19]

Takano

[11] Patent Number: 5,751,172
[45] Date of Patent: May 12, 1998

[54] ELECTRONIC APPARATUS HAVING A COMPUTER

[75] Inventor: Takao Takano, Kawasaki, Japan

[73] Assignee: Canon Kabushiki Kaisha, Tokyo, Japan

[21] Appl. No.: 603,891

[22] Filed: Feb. 22, 1996

[30] Foreign Application Priority Data

Feb. 24, 1995 [JP] Japan .................................. 7-036940

[51] Int. Cl.$^6$ ................................................ H03B 19/00
[52] U.S. Cl. ........................................ 327/113; 327/291
[58] Field of Search ........................... 327/113–117, 291, 327/293, 295

[56] References Cited

U.S. PATENT DOCUMENTS

| | | | |
|---|---|---|---|
| 3,657,658 | 4/1972 | Kubo | 327/115 |
| 4,560,960 | 12/1985 | Channion | 327/115 |
| 4,633,194 | 12/1986 | Kikuchi et al. | 327/115 |
| 5,389,826 | 2/1995 | Sonobe | 327/115 |
| 5,446,398 | 8/1995 | Iwata | 327/117 |

*Primary Examiner*—Toan Tran
*Attorney, Agent, or Firm*—Fitzpatrick, Cella, Harper & Scinto

[57] ABSTRACT

An electronic apparatus switches the frequency of a clock supplied to a computer and provides a clock for serial communication. The apparatus selects a one of plural frequencies for the clock supplied to the computer. The clock for serial communication is maintained at a constant frequency regardless of the frequency of the clock supplied to the computer.

29 Claims, 5 Drawing Sheets

ELECTRONIC APPARATUS HAVING A COMPUTER

BACKGROUND OF THE INVENTION

1. Field of the Invention

The present invention relates to an apparatus having a microcomputer that can switch clock frequencies.

2. Related Background Art

Conventionally, an apparatus in which a microcomputer is mounted alters the clock frequency that is supplied to the microcomputer in order to change the processing speed of the microcomputer and to thus provide a speed that is in accordance with the conditions under which the apparatus is employed. More specifically, when a process is requested that imposes a heavy load on a microcomputer, a high clock frequency is supplied to the microcomputer, which is thus enabled to perform at high speed even a complicated process that imposes a heavy load. When the load that is to be applied to the microcomputer is small, to save on power a low clock frequency is supplied to the microcomputer.

However, as the same clock frequency at which a common microcomputer operates is employed when the microcomputer communicates with peripheral circuits (peripheral devices) to which it is connected, when a clock frequency is reduced as in the above described example, the speed at which the microcomputer and the peripheral devices communicate is also reduced.

SUMMARY OF THE INVENTION

It is one object of the present invention to provide a computer, or an electronic apparatus which incorporates a computer, that for serial communication maintains a constant clock frequency even though the clock frequency supplied to the computer is altered.

To achieve the above object, according to one aspect of the present invention, provided is a computer, or an electronic apparatus which incorporates a computer, that changes a clock frequency that is supplied for the computer to produce a clock frequency for serial communication use.

It is another object of the present invention to provide a computer, or an electronic apparatus which incorporates a computer, that maintains a constant count time rate for a timer that counts time, even though a clock frequency for the computer is switched.

To achieve the above object, according to another aspect of the present invention, provided is a computer, or an electronic apparatus which incorporates a computer, that changes a clock frequency for the computer to produce a clock that is employed by a timer to count time.

Other objects and features of the present invention will become obvious during the course of the following explanation for the embodiments, which is given while referring to the accompanying drawings.

BRIEF DESCRIPTION OF THE DRAWINGS

FIG. 3, which is comprised of FIGS. 3A and 3B, is a flowchart for explaining the operation of the camera in FIG. 2.

DETAILED DESCRIPTION OF THE PREFERRED EMBODIMENTS

The preferred embodiment wherein the present invention is employed for a camera will now be explained.

Figure 1:
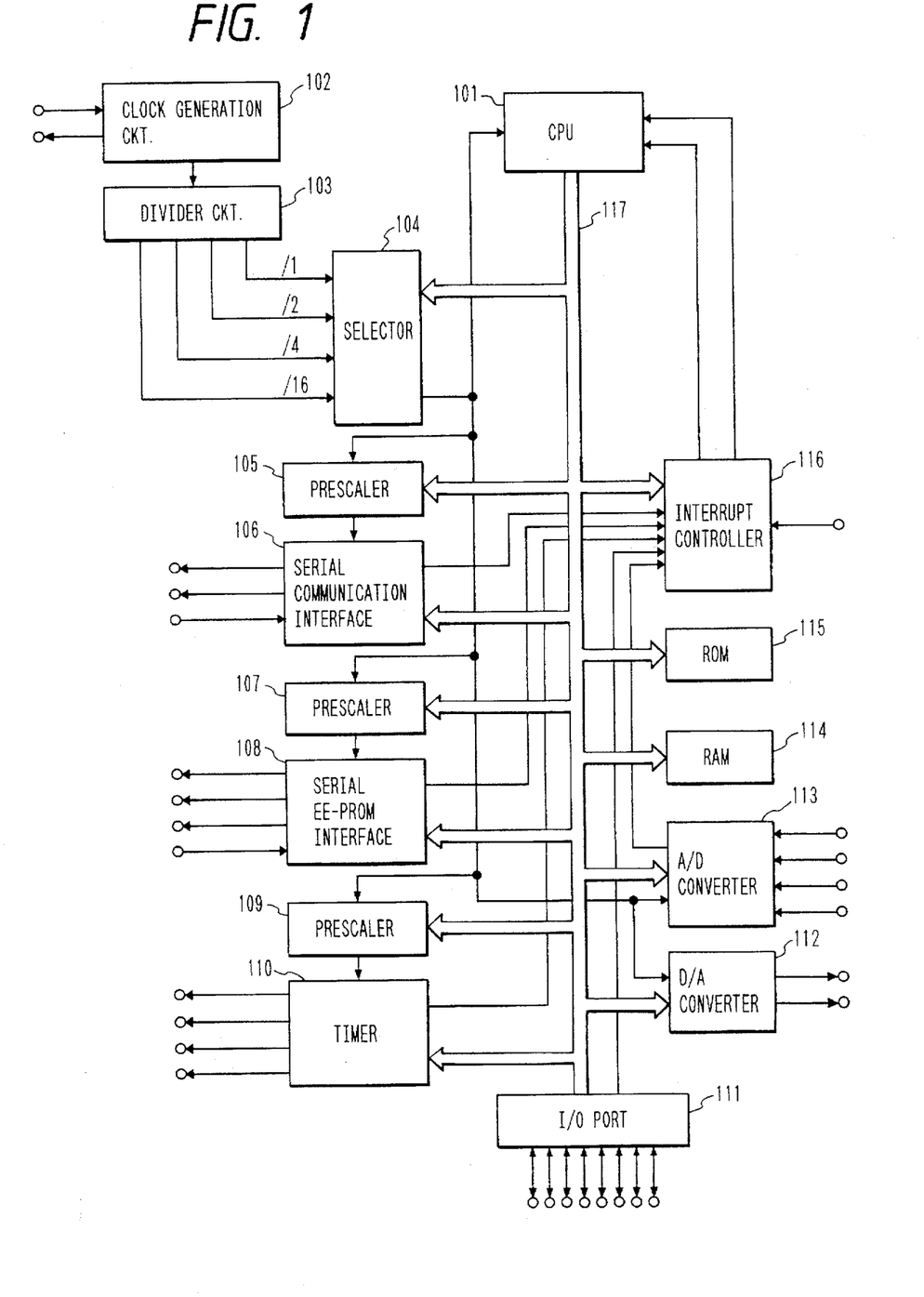
FIG. 1 is a block diagram illustrating a microcomputer according to the present invention.

FIG. 1 is a block diagram illustrating a one-chip microcomputer that is employed for a camera according to this embodiment. The microcomputer controls the photographic sequence of a camera, and operations for line of sight detection and focusing.

In FIG. 1, reference number 101 denotes a CPU. A clock generation circuit 102 serves as generation means for producing a clock frequency that provides the timing for the operation of the microcomputer.

A divider circuit 103 divides a clock frequency that is generated by the oscillator 102 to produce clock frequencies that are ½, ¼, and 1/16 of the original.

A selector 104 selects one of the clock frequencies that are generated by the clock generation circuit 102 and the divider circuit 103 and outputs the selected clock frequency. The divider circuit 103 and the selector 104 constitute first frequency conversion means. The CPU 101 and peripheral circuits that are connected to it are actuated with a clock frequency that is selected by the selector 104.

Prescalers 105, 107 and 109 each serve as second frequency conversion means that divides the clock frequency, which is selected by the selector 104 and is supplied to the CPU 101, by an arbitrary ratio of division in accordance with an instruction from the CPU 101, and supplies the divided frequency to interfaces or a timer, which will be described later.

A serial communication interface 106 serves as a peripheral circuit that communicates with a peripheral device, such as a lens or a strobe, in synchronization with the clock frequency.

A serial EE-PROM interface 108 reads data from, and writes data in, a serial bus EE-PROM that is provided separately from the microcomputer.

A timer 110 serves as time counting means for providing an operational timing for peripheral circuits that are connected to the microcomputer. The timer 110, which includes a 16-bit free running counter and a comparison register, provides a reference time for a photometry timer, which provides an operation timing for a photometry sensor 202 that will be described later, and a distance measuring sensor 203, when it performs a moving body anticipation operation for anticipating the position of a subject in motion and focusing on it.

An I/O port 111 is a general-purpose input/output terminal.

A D/A converter 112 outputs an analog value from inside the microcomputer to outside.

An A/D converter 113 converts an analog value input from outside into a digital value and outputs it.

A RAM 114 is a main storage device for the CPU 101.

A ROM 115 is employed to store execution commands for the CPU 101, which executes them sequentially.

An interrupt controller 116 sets the priority order for interrupts from peripheral interfaces and inhibits interrupts.

Internal buses 117 of the microcomputer, which are a data bus, an address bus and a control bus for the CPU 101, communicate with the peripheral interfaces.

Figure 2:
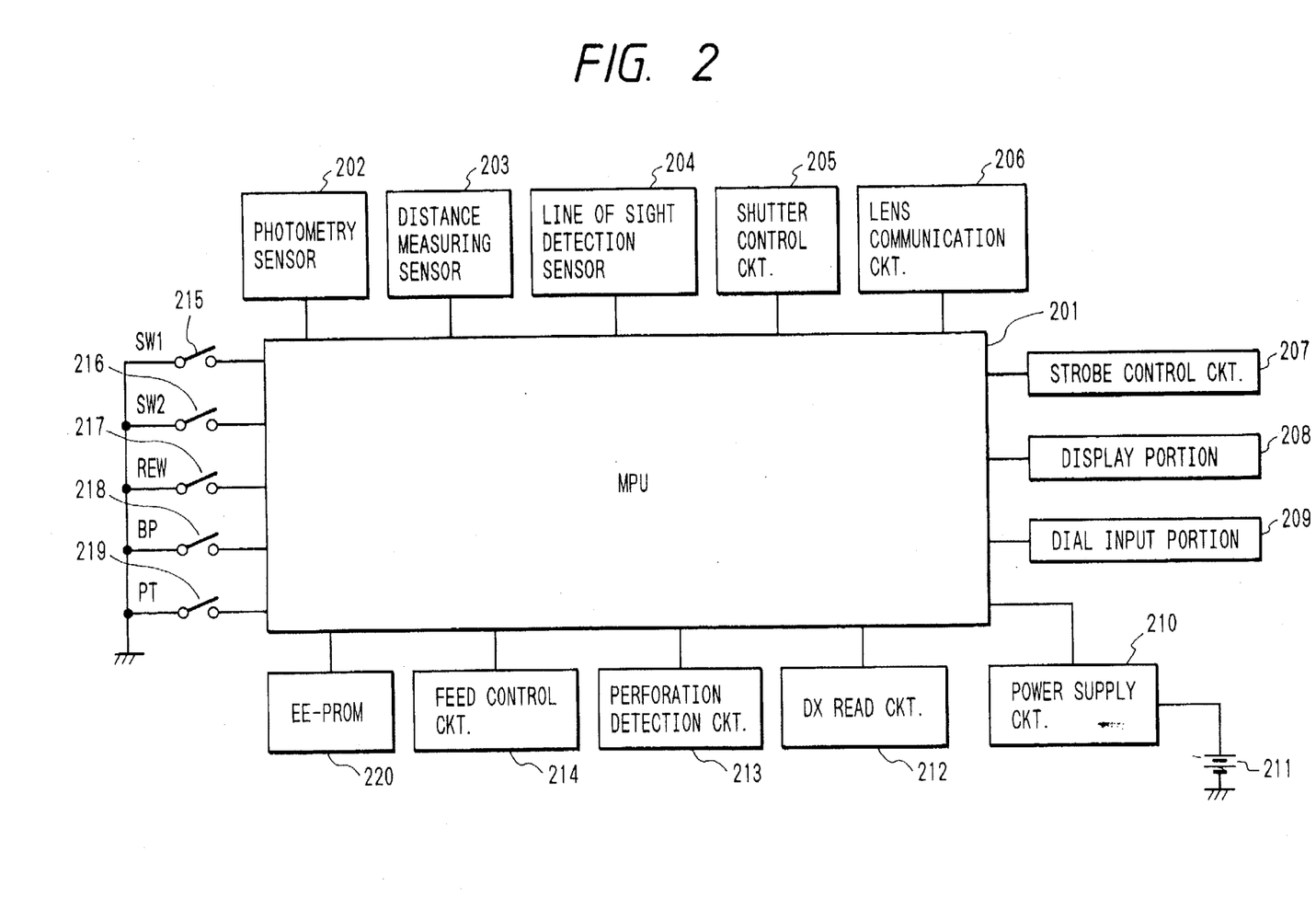
FIG. 2 is a block diagram illustrating an electric circuit when the microcomputer of the present invention is used in a camera.

FIG. 2 is a block diagram illustrating an electric circuit that is used for a camera according to this embodiment.

In FIG. 2, a camera control unit 201, which is the one-chip microcomputer shown in FIG. 1, incorporates a ROM, a RAM, an A/D converter, etc., and, by controlling the peripheral circuits in the camera in accordance with a program stored in the ROM, provides control for all the functions of a camera.

A photometry sensor 202 measures the properties of light to determine the amount of light that is required for an exposure. A distance measuring sensor (focus detection sensor) 203 detects the point at which a subject is in focus (the distance to a subject). A line of sight detection sensor 204 detects the line of sight of a photographer from the position of the center of an eye of the photographer when he sights through a viewfinder. A shutter control circuit 205 opens and closes a shutter for exposure. A lens communication circuit 206 communicates with a lens to receive lens information and to control the lens. A strobe control circuit 207 communicates with a strobe to receive strobe information and to control the strobe. A display portion 208 displays various information, such as shutter speed and an aperture value. A dial input portion 209 inputs various information. A power supply circuit 210, which includes a DC/DC converter and a regulator, supplies power to the individual sections of the camera.

A battery 211 serves as a power source for the camera. A DX read circuit 212 reads the DX code on film. A perforation detection circuit 213 detects the perforations of a film to distinguish between each frame. A feed control circuit 214 includes a motor that takes up and rewinds a film. A photometry and distance measuring switch SW1 215 is turned on in response to the first operation of a release member and begins measuring the properties of light and the distance to a subject. A release switch SW2 216 is turned on in response to the second operation of the release member to begin the release operation. A rewind switch REW 217 is employed to force the rewinding of a film even though all of it has not been exposed. A camera rear-lid detection switch BP 218 detects the opening and closing of the rear-lid of the camera. A cartridge detection switch PT 219 detects the presence of a cartridge. An EE-PROM 220 is employed to store the number of exposures, ISO information, etc. The individual prescalers are constituted by frequency dividers.

Figures 3, 3A:
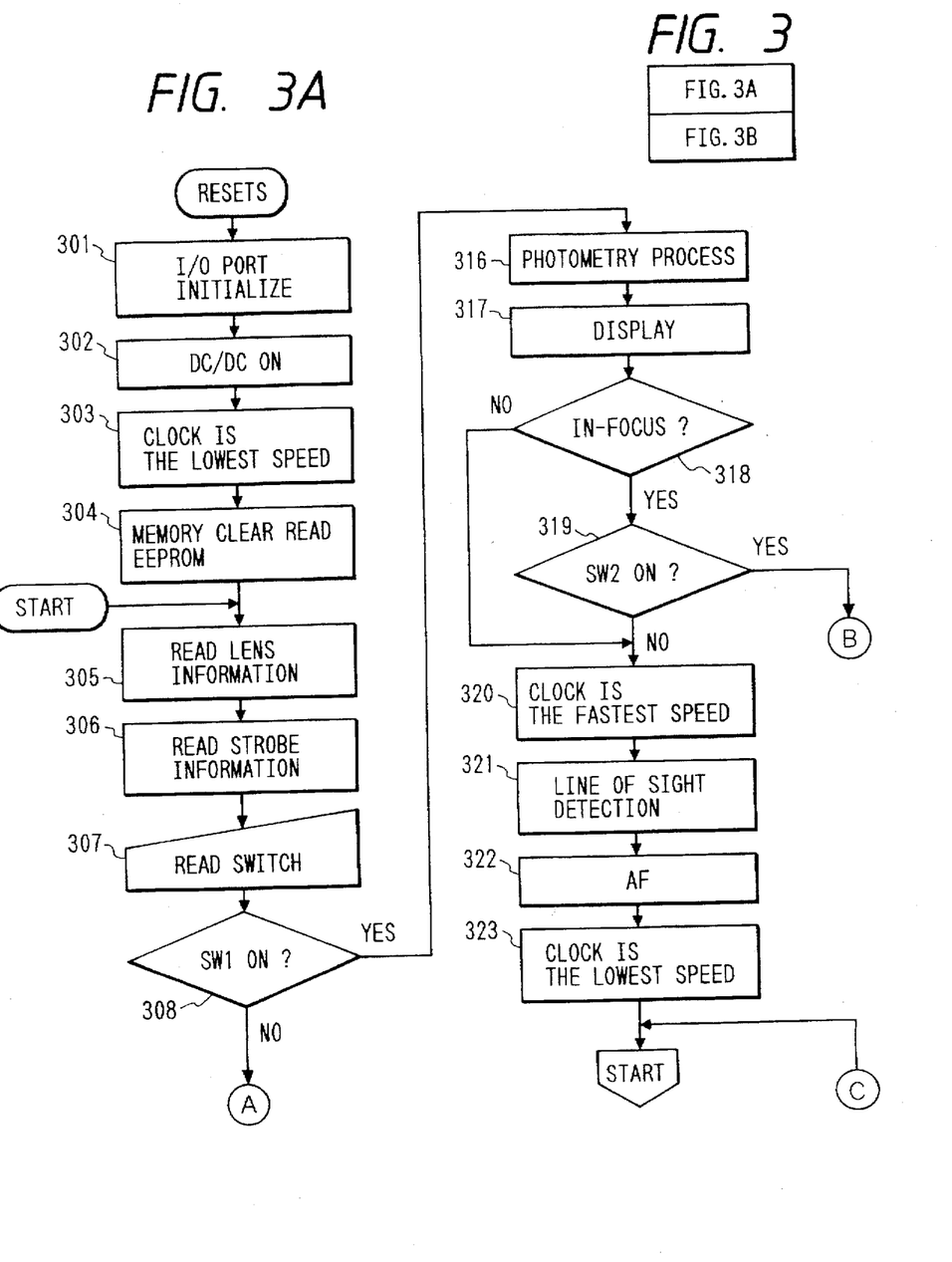
Figure 3B:
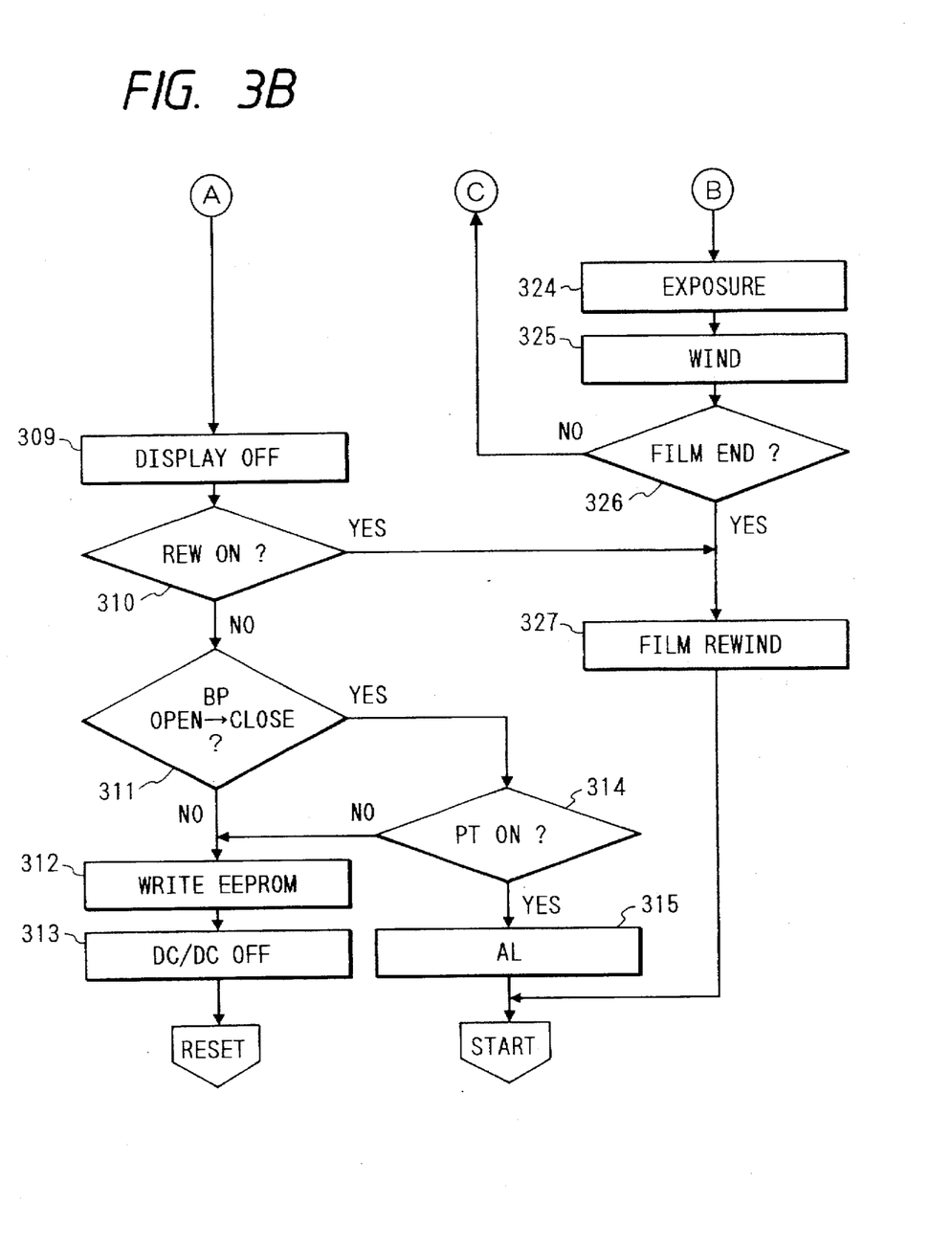

FIGS. 3A and 3B are flowcharts for explaining the operation of the camera in this embodiment.

First, an interrupt signal is generated by operation of the switches that are connected to the I/O port 111, and the CPU 101 is activated by the response of the interrupt controller 116 to the signal. Then, the CPU 101 initializes the I/O port 111 and all the other peripheral interfaces, to include the timer 110 (step 301). The DC/DC converter of the power supply circuit 210 is turned on (step 302).

The clock frequency at this time is set to the lowest speed (1/16 of a generated frequency) (step 303).

Figure 5:
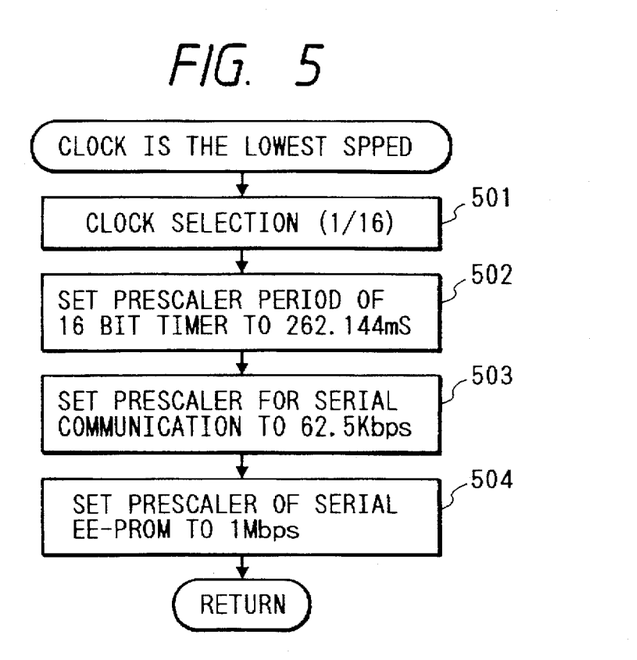
FIG. 5 is a flowchart showing procedures for altering processing speed (lowest speed).

The process by which this is done is shown in FIG. 5. First, the selector 104 selects the 1/16 clock frequency (step 501). Next, the frequency ratio of division for the prescaler 109 of the timer's 16-bit free running counter is so set that one period of the timer is 262.144 mS (step 502). The serial communication prescaler 105 is operated so as to set a communication speed of 62.5 Kbps (step 503). Finally, the serial EE-PROM prescaler 107 is operated to set the communication speed to 1 Mbps (step 504).

Suppose that when the selector 104 has selected a clock frequency obtained by dividing the frequency by 16, i.e., the 1/16 clock frequency, the frequency ratios of division for the prescalers 105, 107 and 109 are automatically set to 1/2. The clocks to the communication interface 106, the EE-PROM interface 108, and the timer 110 are $1/16 \times 1/2 = 1/32$ with respect to the clock from the clock generation circuit 102. The communication speed at this time for communication interface 106 and the EE-PROM interface 108 are set to 62.5 Kbps and 1 Mbps, respectively, and one period of the timer 110 is set to 262.144 mS.

After the speed of the clock frequency has been set, it is necessary for the RAM 114 to be cleared and for data to be read from the EE-PROM 220 (step 304). Since the EE-PROM interface is employed for this data reading, the reading is performed at a communication speed of 1 Mbps.

Lens information is read by the lens communication circuit 206 (step 305).

When a strobe is connected, the strobe information is read by the strobe control circuit 207 (step 306). Since the communication interface 106 is employed for these data readings, data are read at a communication speed of 62.5 Kbps.

Sequentially, the switch states are detected (step 307), and a check is performed to determine whether or not the switch SW1 215 has been depressed (step 308). When the switch SW1 215 has not been depressed, the display on the display portion 208 of a photometry value is halted (step 309).

A check is performed to determine whether or not the rewind switch REW 217 has been depressed (step 310). When the rewind switch REW 217 has not been depressed, a check is performed to determine whether or not the rear-lid detection switch BP 218 has been depressed (step 311). When the state of the rear-lid detection switch BP is changed from the open state to the closed state, a check is performed to determine whether or not the cartridge detection switch PT 219 is turned on (step 314). If the change of the state for the rear-lid detection switch BP 218 is not from the open state to the closed state, program control moves to step 312.

When, at step 314, a cartridge is not present, data are written to the EE-PROM 220 (step 312). At this time, data reading is performed in advance of data writing, and only when the data contents differ are data written. This process is performed at a communication speed of 1 Mbps.

When the data writing to the EE-PROM 220 has been completed, the DC/DC converter of the power supply circuit 210 is turned off, the clock frequency generation circuit 102 is halted, and the CPU 101 waits in the halted state.

If, at step 314, a cartridge is present, auto-loading of the film is performed (step 315). When the auto-loading has been completed, program control returns to step 307.

If, at step 310, the rewind switch REW 217 has been depressed, the rewinding of the film is begun (step 327). Program control thereafter returns to step 305.

Since this control can be performed even when the processing speed for the CPU 101 is low, the clock frequency is set to the lowest speed.

If, at step 308, the switch SW1 215 has been depressed, the photometry sensor 202 measures the properties of light (step 316), and displays the measured light value (step 317).

Following this, a check is performed to determine whether or not a lens is in focus (step 318). At this time, since a focus detection process (AF operation) has not yet been performed, the in-focus state is not detected. Program control advances to step 320, whereat the clock frequency is set so that it is the same as the generated frequency (frequency ratio of division of 1/1).

Figure 4:
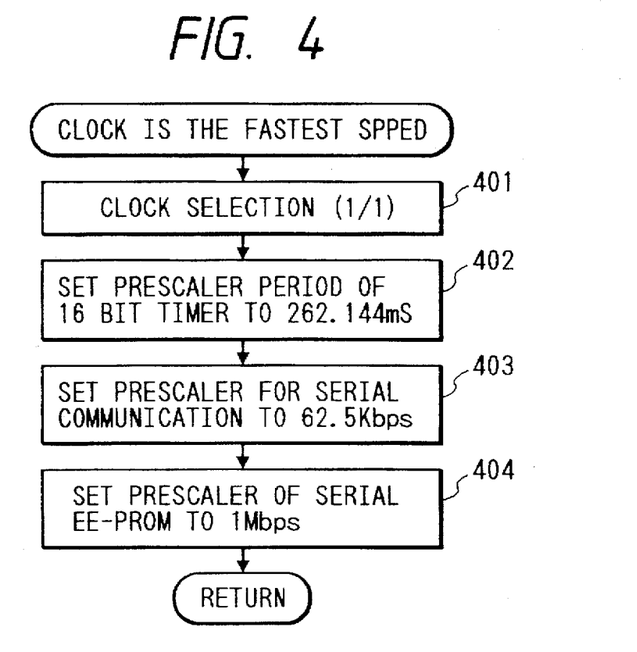
FIG. 4 is a flowchart showing procedures for altering processing speed (highest speed).

This process is shown in FIG. 4. First, the selector 104 selects the 1/1clock frequency (step 401). Then, the frequency ratio of division of the prescaler 109, for the timer 16-bit free running counter, is so set that one period of the timer is 262.144 mS (step 402). The prescaler 105 for serial communication is so set that the communication speed is 62.5 Kbps (step 403). Finally, the prescaler 107 for the serial EE-PROM is so set that the communication speed is 1 Mbps (step 404).

In order to set the communication speed, etc., the ratio of division for the individual prescalers is automatically set to 1/32 in accordance with the selected frequency, i.e., the 1/1 clock frequency, at the selector 104. A clock having a frequency of 1×1/32 is provided, and the communication speed and the period for the timer can be maintained the same as those before the clock is switched.

When the clock frequency speed has been set, the line of sight detection sensor 204 is employed to detect the line of sight (step 321). The line of sight of a photographer is detected and the distance measurement point is selected. The distance measurement line sensor is employed to detect a focus with respect to the selected distance measurement point, and the lens communication circuit 206 communicates with the lens to drive the focusing ring of the lens (step 322).

The clock frequency speed is again returned to the lowest level (step 323), and program control is thereafter returned to step 305.

Later, when program control again advances to step 318 and the condition at that time is in-focus, a check is performed to determine whether the switch SW2 216 is in the ON state or in the OFF state (step 319). When the switch is in the OFF state, program control goes to step 320.

During the processing up to this point, the lens communication, strobe communication, a photometry process, setup of the highest speed of the clock frequency, detection of line of sight, AF, and setup of the lowest speed of the clock frequency are repeated.

If it is determined at step 319 that the release switch SW2 216 is in the ON state, program control advances to step 324. The lens communication circuit 206 transmits an aperture control command to the lens to adjust the aperture, and also the shutter control circuit 205 opens and closes the shutter to expose the film. The exposure duration is counted by the timer 110.

When the shutter has closed, the feed control circuit 214 takes up the film (step 325). At this time, a length of the film that is equivalent to the distance spanning eight perforations, which are detected by the perforation detection circuit 213, is regarded as one frame.

If, at step 326, the end of the film is detected, program control is branched to step 327 (step 326), whereat the rewinding of the film is begun. When all the film has not yet been exposed, program control returns to step 305.

In this embodiment, while the clock frequency of the CPU 101 is increased only for the detection of the line of sight and for the detection of the focus, high speed processing is performed. The clock frequency of the CPU 101 is reduced for the other processes, so that low speed processing is performed.

Even if a frequency that is the same as the clock frequency of the CPU 101 is supplied to the timer 110 and the individual communication interfaces, the ratios of division for frequencies are altered for their connected prescalers in accordance with the selection made by the selector 104, so that the length of one time period for the timer 110, and the communication speeds of the serial communication interface 106 and of the serial EE-PROM interface 108 will not be changed.

More specifically, besides the frequency conversion in the above embodiment, when the clock frequency obtained by dividing the generated frequency by 2 (N) is supplied to the microcomputer, the prescalers 109, 105 and 107, which are connected to the timer 110 and the interfaces 106 and 108, multiply the clock frequency twice (N times). In this manner, even though the clock frequency is altered, the timer is not affected and the communication speeds are not changed.

For the switching of a clock frequency, a clock frequency divider can be provided outside the microcomputer, or a PLL (Phase Locked Loop) can be employed.

In addition, a length of time that is provided and that is equivalent to one time period for the timer 110 can be utilized as an exposure duration or for a "wait" process in the flowchart. In this case, the wait process is performed not by switching the clock but upon the expiration of a period of time that is determined in advance.

What is claimed is:

1. A computer, which performs serial communication with peripheral circuits, comprising:

(a) a generation circuit for generating a clock;
   (b) a first frequency conversion circuit for converting said clock from said generation circuit into a clock having an arbitrary frequency, said computer being operated with said clock converted by said conversion circuit, and
   (c) a second frequency conversion circuit for adjusting said frequency of said clock from said second frequency conversion circuit in accordance with said frequency converted by said first frequency conversion circuit, said peripheral circuits performing serial communication at a clock from said second frequency circuit, wherein the relationship of said frequency of said clock from said second conversion circuit and said frequency of said clock from said first conversion circuit is such that, when said frequency of said clock from said first frequency conversion circuit is 1/N of said frequency of said clock from said generation circuit, said second frequency circuit provides a clock having a frequency that is N times said frequency from said first conversion circuit, N being an integer greater than 1.

2. An electronic apparatus having a computer that performs serial communication with peripheral circuits comprising:

(a) a switching circuit capable of switching a frequency of a clock supplied to the computer; and
   (b) a frequency supply circuit responsive to the clock supplied to the computer for producing a clock signal of constant frequency for said serial communication, regardless of whether said frequency of said clock supplied to the computer is switched, wherein said frequency supply circuit includes a frequency adjustment circuit that adjusts, to the constant frequency, the clock frequency for serial communication when the clock supplied to said computer is switched to a first frequency, and when the clock supplied to said computer is switched to a second frequency.

3. An electronic apparatus according to claim 2, wherein said frequency adjustment circuit adjusts a frequency ratio of division for said clock supplied to said computer to adjust said clock frequency for said serial communication.

4. An electronic apparatus having a computer that performs serial communication with peripheral circuits, comprising:
   (a) a generation circuit for generating a clock,
   (b) a first frequency conversion circuit for converting said clock from said generation circuit into a clock having an arbitrary frequency, said computer being operated with said clock converted by said conversion circuit; and
   (c) a second frequency conversion circuit, for adjusting said frequency of said clock from said second frequency conversion circuit in accordance with said frequency converted by said first frequency conversion circuit, said peripheral circuits performing serial communication by a clock from said second frequency conversion circuit.

5. An electronic apparatus according to claim 4, wherein said second frequency conversion circuit adjusts, to the same frequency, a clock frequency from said second frequency conversion circuit when said clock to said computer is switched to a first arbitrary frequency, and when said clock to said computer is switched to a second arbitrary frequency.

6. An electronic apparatus according to claim 5, wherein said second frequency conversion circuit adjusts said clock frequency from the second frequency conversion circuit by changing a ratio of division to said clock from said first frequency conversion circuit.

7. A computer comprising:
   (a) a generation circuit for generating a clock;
   (b) a first frequency conversion circuit for converting said clock from said generation circuit into a clock having an arbitrary frequency, said computer being operated with said frequency converted by said conversion circuit, and
   (c) a second frequency conversion circuit for adjusting said frequency of said clock from said second frequency conversion circuit to be a constant frequency in accordance with said frequency converted by said first frequency conversion circuit, and
   (d) a timer for counting time in accordance with said frequency adjusted by said second frequency conversion circuit.

8. An electronic apparatus having a computer that is capable of switching a frequency of a supplied clock, comprising:
   (a) a frequency adjustment circuit for forming a clock having a constant frequency from the supplied clock, regardless of whether said frequency of said clock is switched; and
   (b) a timer circuit for counting time in accordance with the frequency of the constant frequency clock.

9. An electronic apparatus according to claim 8, wherein said frequency adjustment circuit adjusts, to the constant frequency, a clock frequency from said adjustment frequency circuit when said clock to said computer is switched to a first frequency, and when said clock to said computer is switched to a second frequency.

10. An electronic apparatus according to claim 8, wherein said frequency adjustment circuit adjusts said clock frequency from the clock frequency adjustment circuit by changing a ratio of division to said supplied clock.

11. An electronic apparatus having a computer, comprising:
   (a) a generation circuit for generating a clock;
   (b) a first frequency conversion circuit for converting said clock from said generation circuit into a clock having an arbitrary frequency, said computer being operated with said clock converted by said conversion circuit;
   (c) a second frequency conversion circuit, for adjusting said frequency of said clock from said second frequency conversion circuit to be a constant frequency in accordance with said frequency converted by said first frequency conversion circuit; and
   (d) a timer for counting time in accordance with said frequency adjusted by said second frequency conversion circuit.

12. An electronic apparatus according to claim 11, wherein said second frequency conversion circuit adjusts, to the constant frequency, a clock frequency from said second frequency conversion circuit when said clock to said computer is switched to a first arbitrary frequency, and when said clock to said computer is switched to a second arbitrary frequency.

13. An electronic apparatus according to claim 11, wherein said second frequency conversion circuit adjusts said clock frequency from the second frequency conversion circuit by changing a ratio of division to said clock from said first frequency conversion circuit.

14. An electronic apparatus according to claim 11, wherein said electronic apparatus performs serial communication with peripheral circuits a clock from said second frequency conversion circuit.

15. An electronic apparatus having a computer that performs serial communication with peripheral circuits comprising:
   (a) a switching circuit capable of switching a frequency of a clock supplied to the computer, and
   (b) a frequency supply circuit responsive to the clock supplied to the computer for producing a clock signal of constant frequency for said serial communication, regardless of whether said frequency of said clock supplied to the computer is switched,
   wherein said electronic apparatus is a camera and said peripheral circuits are accessories that are mounted to said camera.

16. An electronic apparatus according to claim 2, wherein said electronic apparatus is a camera and said peripheral circuits are accessories that are mounted to said camera.

17. An electronic apparatus according to claim 4, wherein said electronic apparatus is a camera and said peripheral circuits are accessories that are mounted within said camera.

18. An electronic apparatus according to claim 5, wherein said electronic apparatus is a camera and said peripheral circuits are accessories that are mounted within said camera.

19. A computer, which performs serial communication with peripheral circuits and is capable of switching a frequency of a clock supplied to the computer, comprising:
   (a) a switching circuit for switching the frequency of the clock supplied to the computer; and
   (b) a frequency supply circuit responsive to the clock supplied to the computer for producing a clock signal of constant frequency for said serial communication, regardless of whether said frequency of said clock supplied to the computer is switched,
   wherein said frequency supply circuit includes a frequency adjustment circuit that adjusts, to the constant frequency, a clock frequency for serial communication when the clock supplied to said computer is switched to a first frequency, and when the clock supplied to said computer is switched to a second frequency.

20. A computer according to claim 19, wherein said frequency adjustment circuit adjusts a frequency ratio of division to said clock supplied to said computer to adjust said clock frequency for said serial communication.

21. A computer, which performs serial communication with peripheral circuits, comprising:

(a) a generation circuit for generating a clock, (b) a first frequency conversion circuit for converting said clock from said generation circuit into a clock having an arbitrary frequency, said computer being operated with said clock converted by said conversion circuit; and (c) a second frequency conversion circuit, for adjusting said frequency of said clock from said second frequency conversion circuit in accordance with said frequency converted by said first frequency conversion circuit, and said peripheral circuits performing serial communication by a clock from said second frequency conversion circuit.

22. A computer according to claim 21, wherein said second frequency conversion circuit adjusts, to the same frequency, a clock frequency from said second frequency conversion circuit when said clock to said computer is switched to a first arbitrary frequency, and when, said clock to said computer is switched to a second arbitrary frequency.

23. A computer according to claim 22, wherein said second frequency conversion circuit adjusts said clock frequency from the second frequency conversion circuit by changing a ratio of division to said clock from said first frequency conversion circuit.

24. A computer, which is capable of switching a frequency of a supplied clock, comprising:

(a) a frequency adjustment circuit for forming a clock having a constant frequency from the supplied clock, regardless of whether said frequency of said clock is switched; and (b) a timer circuit for counting time in accordance with the frequency of the constant frequency clock.

25. A computer according to claim 24, wherein said frequency adjustment circuit adjusts, to the constant frequency, a clock frequency from said adjustment frequency circuit when said clock to said computer is switched to a first frequency, and when said clock to said computer is switched to a second frequency.

26. A computer according to claim 25, wherein said frequency adjustment circuit adjusts said clock frequency from the second frequency conversion circuit by changing a ratio of division to said clock.

27. A computer comprising:

(a) a generation circuit for generating a clock;

(b) a first frequency conversion circuit for converting said clock from said generation circuit into a clock having an arbitrary frequency, said computer being operated with said clock converted by said conversion circuit;

(c) a second frequency conversion circuit, for adjusting said frequency of said clock from said second frequency conversion circuit to a be constant frequency in accordance with said frequency converted by said first frequency conversion circuit; and (d) a timer for counting time in accordance with said frequency adjusted by said second frequency conversion circuit.

28. A computer according to claim 27, wherein said second frequency conversion circuit adjusts, to the constant frequency, a clock frequency from said second frequency conversion circuit when said clock to said computer is switched to a first arbitrary frequency, and when said clock to said computer is switched to a second arbitrary frequency.

29. A computer according to claim 27, wherein said second frequency conversion circuit adjusts said clock frequency from the second frequency conversion circuit by changing a ratio of division to said clock from said first frequency conversion circuit.

* * * * *

UNITED STATES PATENT AND TRADEMARK OFFICE
CERTIFICATE OF CORRECTION

PATENT NO. : 5,751,172

DATED : May 12, 1998

INVENTOR(S) : TAKAO TAKANO

It is certified that error appears in the above-identified patent and that said Letters Patent is hereby corrected as shown below:

[57] ABSTRACT

Line 4, "a" should be deleted.

COLUMN 1

Line 25, "above described" should read
--above-described--.

COLUMN 10

Line 20, "to a be" should read --to be a--.

Signed and Sealed this

Second Day of March, 1999

Attest:

Attesting Officer

Q. TODD DICKINSON

Acting Commissioner of Patents and Trademarks